(12) United States Patent
Taoka (10) Patent No.: US 8,537,244 B2
(45) Date of Patent: Sep. 17, 2013

(54) IMAGE PROCESSING APPARATUS AND METHOD, AND COMPUTER-READABLE MEDIUM HAVING STORED THEREON COMPUTER PROGRAM FOR EXECUTING THE METHOD

(75) Inventor: Mineki Taoka, Yokohama (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 295 days.

(21) Appl. No.: 12/969,687

(22) Filed: Dec. 16, 2010

(65) Prior Publication Data

US 2011/0141308 A1 Jun. 16, 2011

(30) Foreign Application Priority Data

Dec. 16, 2009 (JP) ................................. 2009-285540
Feb. 24, 2010 (KR) ......................... 10-2010-0016667

(51) Int. Cl.
*H04N 5/76* (2006.01)

(52) U.S. Cl.
USPC ...................... 348/231.6; 348/241; 348/231.1

(58) Field of Classification Search
USPC .................. 348/231.99, 231.6, 372, 294, 241
See application file for complete search history.

(56) References Cited

U.S. PATENT DOCUMENTS 6,989,872 B2 * 1/2006 Nakatsuji et al. ............. 348/806

FOREIGN PATENT DOCUMENTS

JP 2004-234379 A 8/2004
JP 2008-236544 A 10/2008

* cited by examiner

*Primary Examiner* — Tuan Ho (74) *Attorney, Agent, or Firm* — Drinker Biddle & Reath LLP (57) ABSTRACT

An embodiment of the invention provides an image processing apparatus and method capable of reducing power consumption by controlling supply of a clock to a memory when correction is performed on image data. The image processing apparatus includes an image correction unit including a plurality of line memories to maintain image data line-by-line and perform correction on the image data, a number-of-line-memories determination unit for determining the number of line memories necessary for the correction performed by the image correction unit line-by-line, and a line memory control unit for controlling supply of a clock to the plurality of line memories based on the number of line memories determined by the number-of-line-memories determination unit to supply a clock to the line memories used for the correction performed by the image correction unit line-by-line and stop supply of the clock to line memories not used for the correction.

10 Claims, 9 Drawing Sheets

IMAGE PROCESSING APPARATUS AND METHOD, AND COMPUTER-READABLE MEDIUM HAVING STORED THEREON COMPUTER PROGRAM FOR EXECUTING THE METHOD

CROSS-REFERENCE TO RELATED PATENT APPLICATION

This application claims the benefit of Japan Patent Application No. 2009-285540, filed on Dec. 16, 2009, in the Japan Patent Intellectual Property Office and the benefit of Korean Patent Application No. 10-2010-0016667, filed on Feb. 24, 2010, in the Korean Intellectual Property Office, the disclosures of which are incorporated herein in their entirety by reference.

BACKGROUND

An embodiment of the invention relates to an image processing apparatus and method.

In an image captured using a photographing device, such as a digital photographing device, a video camera, a film camera, or the like, distortion is generated due to an influence of distortion aberration characteristics of a lens. Distortion of an image is not serious when a high-performance lens is used, but it is difficult to perfectly avoid an influence of distortion of an image when a low-performance and cheap lens is used or an optical zoom lens is used. Recently, an image processing apparatus for correcting distortion of an image through signal processing has been recently proposed, for example, in the following patent documents: Japanese Patent Laid-Open Gazette No. 2008-236544 ("the '544 Patent Publication") and Japanese Patent Laid-Open Gazette No. 2004-234379 ("the '379 Patent Publication")

The invention disclosed in the '544 Patent Publication divides image data into rectangular data having a horizontal width corresponding to a predetermined number of pixels, determines whether an image to be corrected is convex-distorted or concave-distorted to divide the image into 4 quadrants by using a horizontal axis and a vertical axis which pass through the center, and determines to which quadrant a quadrant of a rectangle to be corrected corresponds to correct optical distortion different for each rectangle in each quadrant. The invention disclosed in the '379 Patent Publication compresses a distortion quantity necessary as a parameter during distortion correction by using an operation to reduce the size of a parameter maintaining memory.

However, the invention disclosed in the '544 Patent Publication is meaningless when the number of static random access memories (SRAMs) for distortion correction is nearly fixed, and in some correction modes, some line memories are not used. The invention disclosed in the '379 Patent Publication can reduce the circuit scale by reducing the usage of a huge-size parameter table, but some line memories are not used like in the invention disclosed in the '544 Patent Publication. Many SRAMs need to be mounted for distortion correction, but they are not mostly used for purposes other than distortion correction. Conventionally, clocks are provided to all the SRAMs, increasing power consumption.

SUMMARY

Various embodiments of the invention provide an image processing apparatus and method, in which supply of a clock to a memory is controlled when correction is performed on image data, thereby reducing power consumption.

According to an embodiment of the invention, there is provided an image processing apparatus including an image correction unit, a number-of-line-memories determination unit, and a line memory control unit. The image correction unit includes a plurality of line memories, maintains image data line-by-line, and performs correction on the image data. The number-of-line-memories determination unit determines the number of line memories necessary for the correction performed by the image correction unit line-by-line. The line memory control unit controls supply of a clock to the plurality of line memories based on the number of line memories determined by the number-of-line-memories determination unit in such a way to supply a clock to the line memories used for the correction performed by the image correction unit line-by-line and stop supply of the clock to line memories not used for the correction.

According to the foregoing structure of the image processing apparatus, the image correction unit includes a plurality of line memories, maintains image data line-by-line, and performs correction on the image data, the number-of-line-memories determination unit determines the number of line memories necessary for the correction performed by the image correction unit line-by-line, and the line memory control unit controls supply of a clock to the plurality of line memories based on the number of line memories determined by the number-of-line-memories determination unit in such a way to supply a clock to the line memories used for the correction performed by the image correction unit line-by-line and stop supply of the clock to line memories not used for the correction. As a result, by determining the number of line memories necessary for correction of image data, supplying a clock to only the necessary line memories, and stopping supply of the clock to line memories not used for the correction, power consumed by the correction of the image data can be reduced.

The line memory control unit may control the supply of the clock to the plurality of line memories each time the correction of a correction target line of the image data is completed. In this way, by controlling the supply of the clock line-by-line, power consumption can be reduced.

The image correction unit may perform distortion correction to correct distortion of the image data. In this way, by determining the number of line memories necessary for distortion correction for correcting distortion of the image data, supplying the clock to the necessary memory line memories, and stopping supply of the clock to memory line memories not used for the distortion correction, power consumption can be reduced.

The number-of-line-memories determination unit may determine the number of line memories line-by-line by using information about a distortion quantity of the image data. Hence, when distortion correction for correcting distortion of the image data is performed, the number of line memories necessary for the distortion correction can be determined from a distortion quantity of the image data.

The image correction unit may further include an image dividing unit for dividing the image data that is subject to the correction of the image correction operation, wherein the image dividing operation includes performing the correction on the divided image data. By dividing the image data, the amount of image data stored in a single line memory can be reduced.

The number-of-line-memories determination unit may determine the number of line memories necessary for correction performed by the image correction unit line-by-line in the image data divided by the image dividing unit. As a result, by determining the number of line memories necessary for distortion correction of the divided image data, supplying the clock to the necessary memory line memories, and stopping supply of the clock to memory line memories not used for the distortion correction, power consumption can be reduced. In addition, since a central portion of image data generally has little distortion, a small number of line memories may be used to perform correction on the central portion obtained by dividing the image data, contributing to power consumption reduction.

The image correction unit may perform chromatic aberration correction to correct chromatic aberration of the image data. Hence, by determining the number of line memories necessary for chromatic aberration correction for correcting chromatic aberration of the image data, supplying the clock to the necessary memory line memories, and stopping supply of the clock to memory line memories not used for the distortion correction, power consumption can be reduced.

The image processing apparatus may further include an image data storing unit for storing the image data to be corrected by the image correction unit and a maximum value and a minimum value of a distortion quantity of each correction target line of the image data, and the number-of-line-memories determination unit may determine the number of line memories necessary for the correction performed by the image correction unit line-by-line based on the maximum value and the minimum value stored in the image data storing unit. As a result, by using a maximum value and a minimum value of a distortion quantity for each correction target line, the number-of-line-memories determination unit can determine the number of line memories necessary for the correction performed by the image correction unit.

The image processing apparatus may further include a distortion quantity maintaining unit for maintaining the maximum value and the minimum value of the distortion quantity of each correction target line of the image data, and the line memory control unit may determine the number of additional read line memories and the number of discard line memories relative to a previous correction target line immediately before a current correction target line based on a maximum value and a minimum value regarding the current correction target line and a maximum value and a minimum value regarding the previous correction target line, which are maintained in the distortion quantity maintaining unit. In this way, by determining the number of additional read line memories and the number of discard line memories from information about the maximum and minimum values regarding the previous correction target line, the line memory control unit can control power supply to supply power only to the necessary line memories.

According to another embodiment of the invention, there is provided an image processing method including an image correction operation of maintaining image data line-by-line in a plurality of line memories and performing correction on the image data, a number-of-line-memories determination operation of determining the number of line memories necessary for the correction performed by the image correction unit line-by-line, and a line memory controlling operation of controlling supply of a clock to the plurality of line memories based on the number of line memories determined by the number-of-line-memories determination unit in such a way to supply a clock to the line memories used for the correction performed by the image correction unit line-by-line and stop supply of the clock to line memories not used for the correction.

According to the foregoing structure of the image processing method, the image correction operation involves maintaining image data line-by-line in a plurality of line memories and performing correction on the image data. The number-of-line-memories determination operation involves determining the number of line memories necessary for the correction performed by the image correction unit line-by-line. The line memory controlling operation involves controlling supply of a clock to the plurality of line memories based on the number of line memories determined by the number-of-line-memories determination unit in such a way to supply a clock to the line memories used for the correction performed by the image correction unit line-by-line and stop supply of the clock to line memories not used for the correction. As a result, by determining the number of line memories necessary for correction of image data, supplying a clock to only the necessary line memories, and stopping supply of the clock to line memories not used for the correction, power consumed by the correction of the image data can be reduced.

According to still another embodiment of the invention, there is provided a computer-readable medium having stored thereon a computer program for executing an image processing method, the image processing method including an image correction operation of maintaining image data line-by-line in a plurality of line memories and performing correction on the image data, a number-of-line-memories determination operation of determining the number of line memories necessary for the correction performed by the image correction unit line-by-line, and a line memory controlling operation of controlling supply of a clock to the plurality of line memories based on the number of line memories determined by the number-of-line-memories determination unit in such a way to supply a clock to the line memories used for the correction performed by the image correction unit line-by-line and stop supply of the clock to line memories not used for the correction.

Therefore, by determining the number of line memories necessary for correction of image data, supplying a clock to only the necessary line memories, and stopping supply of the clock to line memories not used for the correction, power consumed by the correction of the image data can be reduced.

BRIEF DESCRIPTION OF THE DRAWINGS

The above and other features and advantages of the invention will become more apparent by describing in detail an exemplary embodiment thereof with reference to the attached drawings in which.

DETAILED DESCRIPTION

The following description and attached drawings are provided to understand operations according to the invention, and parts that can be easily implemented by those of ordinary skill in the art may be omitted.

The specification and drawings are not intended to limit the invention and the scope of the invention should be defined by appended claims. Terms used in the specification should be construed as meanings and concepts which coincide with the technical spirit of the invention to most properly describe the invention.

Hereinafter, embodiments of the invention will be described with reference to the accompanying drawings.

Embodiments of the invention are applicable to an image processing apparatus and method, and in particular, to an image processing apparatus and method which corrects distortion generated in image data.

First, a description will be made of an image processing apparatus according to an embodiment of the invention. The image processing apparatus according to an embodiment of the invention may be implemented in the form of a digital photographing device. In the specification, a description will be focused on an embodiment where the image processing apparatus is implemented with a digital photographing device. However, the scope of the invention is not limited to such an embodiment where the image processing apparatus is implemented with a digital photographing device, and the invention may also be implemented in various forms such as a general-purpose computer or the like.

Figure 1:
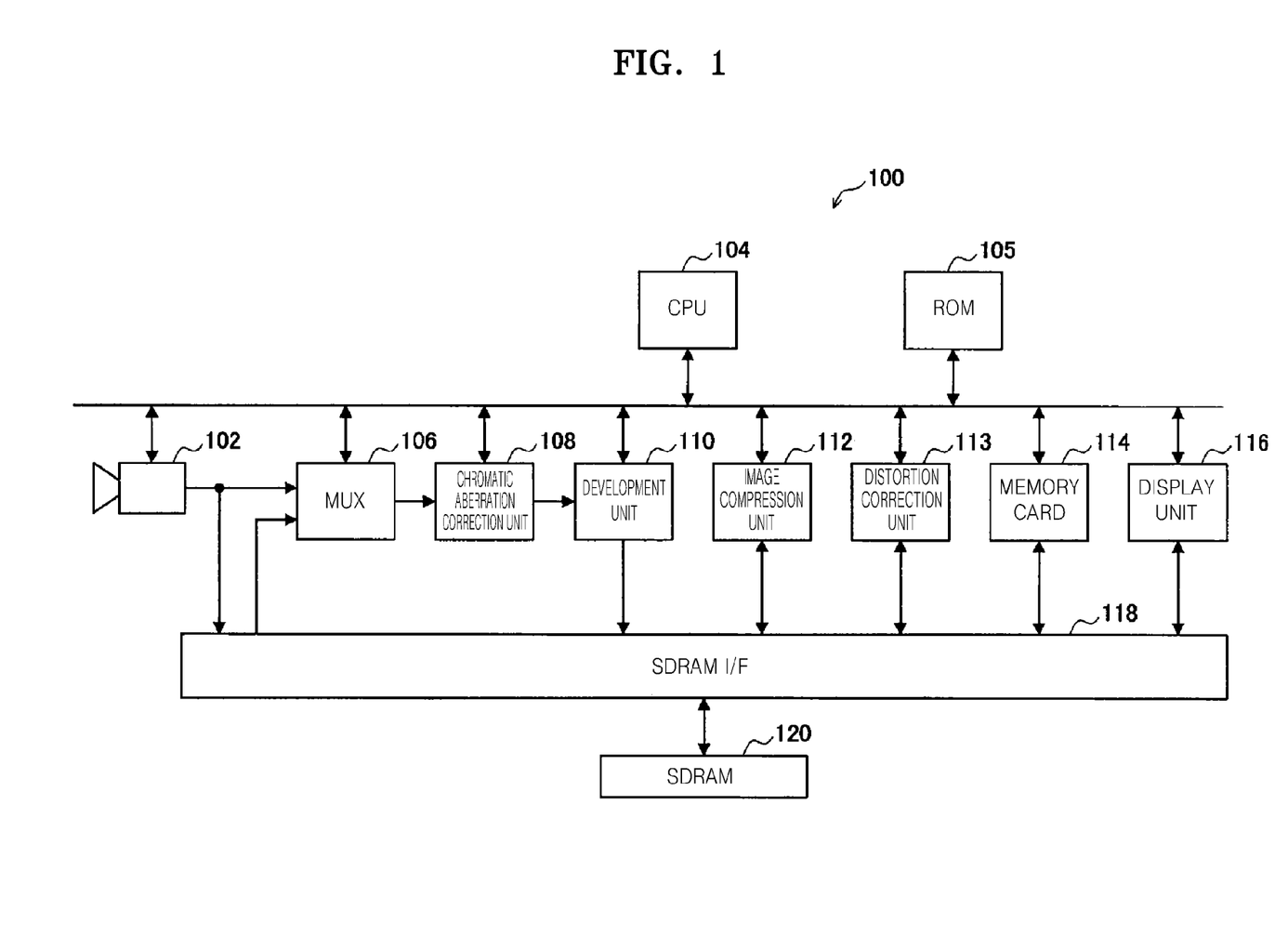
FIG. 1 is a block diagram of a digital photographing device according to an embodiment of the invention.

FIG. 1 is a block diagram of a digital photographing device 100 according to an embodiment of the invention. Hereinafter, the digital photographing device 100 according to an embodiment of the invention will be described with reference to FIG. 1.

As shown in FIG. 1, the digital photographing device 100 includes a lens unit 102, a central processing unit (CPU) 104, a read only memory (ROM) 105, a multiplexer (MUX) 106, a lateral chromatic aberration correction unit 108, a development unit 110, an image compression unit 112, a distortion correction unit 113, a memory card 114, a display unit 116, a synchronous dynamic random access memory (SDRAM) interface (I/F) 118, and an SDRAM 120.

The lens unit 102 includes a zoom lens, a focus lens, and an image pickup device having a Bayer color filter array, though not shown in FIG. 1. In the lens unit 102, the image pickup device photoelectrically transforms light from a subject and outputs RGB image data of a Bayer array from the image pickup device. The image pickup device may be a charge coupled device (CCD) image sensor or a complementary metal oxide semiconductor (CMOS) image sensor. The Bayer-array RGB image data generated and output by the lens unit 102 (which will hereinafter be referred to as 'data' for short) is output to the SDRAM 120 through the SDRAM I/F 118 or is output directly to the MUX 106.

The CPU 104 controls the operation of each component of the digital photographing device 100. The ROM 105 sets various programs or setting information used to control the operation of the digital photographing device 100. The MUX 106 inputs the data generated and output by the lens unit 102 and image data stored in the SDRAM 120, and outputs the data and the image data to the lateral chromatic aberration correction unit 108.

The lateral chromatic aberration correction unit 108 performs predetermined chromatic aberration correction on the data generated by the lens unit 102. The data which undergoes the chromatic aberration correction is output to the development unit 110 and then output to the SDRAM 120 through the SDRAM I/F 118.

The development unit 110 generates image data including YCbCr information containing a luminance signal and a chrominance signal, by using the data which is generated by the lens unit 102 and undergoes chromatic aberration correction in the lateral chromatic aberration correction unit 108, that is, performs an operation corresponding to development. The image data generated by the development unit 110 is output to the SDRAM 120 through the SDRAM I/F 118.

The image compression unit 112 performs predetermined image compression on the image data stored in the SDRAM 120. The predetermined image compression may be compression complying with the Joint Photographing Experts Group (JPEG) standard. The image data compressed by the image compression unit 112 under the control of the CPU 104 is output to the SDRAM 120 through the SDRAM I/F 118.

The distortion correction unit 113 performs distortion correction on the image data stored in the SDRAM 120 while suppressing power consumption by controlling supply of a clock to the SDRAM 120. The distortion of the image data stored in the SDRAM 120 may be corrected by the distortion correction unit 113, and at the same time, power consumption can be suppressed, unlike in conventional arts. The structure of the distortion correction unit 113 will be described later.

The memory card 114 stores the image data compressed by the image compression unit 112 and then stored in the SDRAM 120. Recording of the image data onto the memory card 114 is performed under the control of the CPU 104.

The display unit 116 displays various setting screens of the digital photographing device 100, displays data generated by the lens unit 102 in real time (that is, displays a live-view), or displays image data stored in the memory card 114. The display unit 116 may be implemented using a liquid crystal display (LCD), an organic electroluminescence display, or the like.

The SDRAM I/F 118 is an interface with the SDRAM 120, which interfaces recording of data onto or reading of data from the SDRAM 120. The SDRAM 120 temporarily stores the data generated by the lens unit 102, the data developed by the development unit 110, and the image data compressed by the image compression unit 112.

The digital photographing device 100 may include an input unit (not shown) for inputting thereto user's input manipulation, and the input unit may include a shutter button for executing photographing or a manipulation button for manipulating the digital photographing device 100.

The structure of the digital photographing device 100 according to an embodiment of the invention has been described above with reference to FIG. 1. Next, the structure of the distortion correction unit 113 according to an embodiment of the invention will be described.

Example Of Structure Of Distortion Correction Unit

Figure 2:
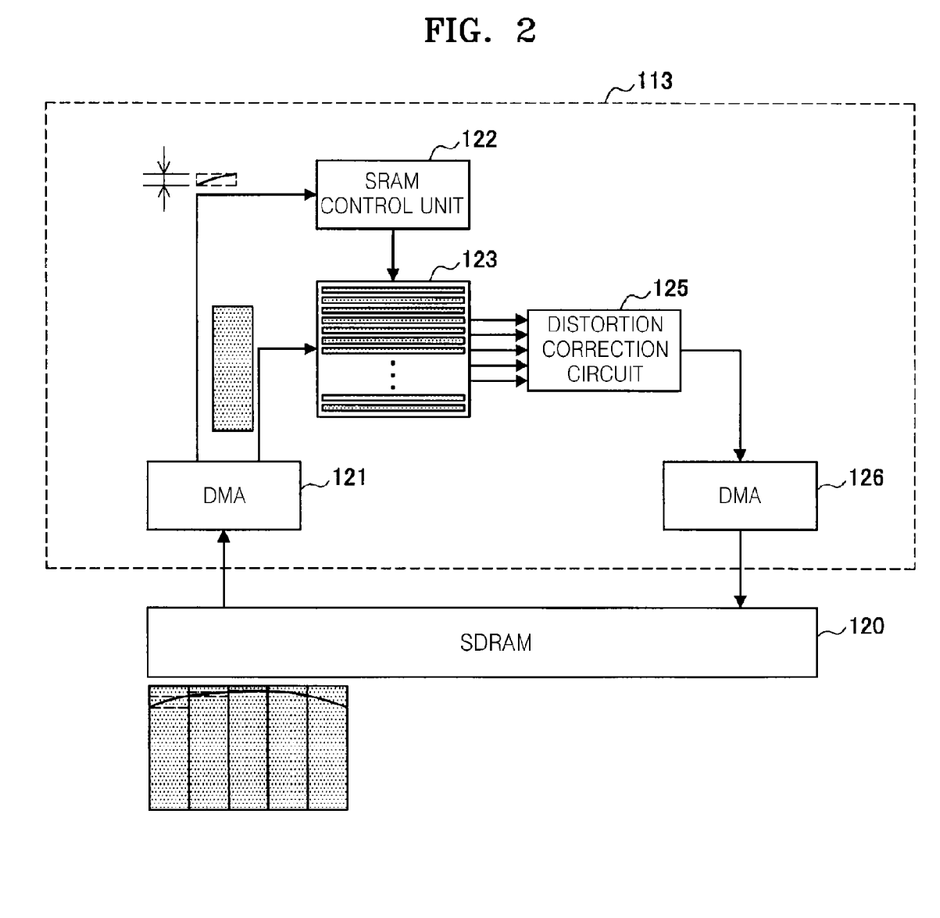
FIG. 2 is a block diagram schematically showing a distortion correction unit according to an embodiment of the invention.

FIG. 2 is a diagram schematically showing the distortion correction unit 113 according to an embodiment of the invention. Hereinafter, the structure of the distortion correction unit 113 according to an embodiment of the invention will be described with reference to FIG. 2.

As shown in FIG. 2, the distortion correction unit 113 according to an embodiment of the invention may include direct memory access (DMAs) 121 and 126, an SRAM control unit 122, an SRAM 123, and a distortion correction circuit 125.

The DMA 121 accesses the SDRAM 120 to read image data stored in the SDRAM 120, which is subject to distortion correction. The DMA 121 divides the image data read from the SDRAM 120 into several rectangles in a horizontal direction, and provides the rectangles to the SRAM 123 and distortion quantity information of the image data to the SRAM control unit 122. The DMA 126 writes the image data which has been distortion-corrected by the distortion correction circuit 125 into the SDRAM 120.

The SRAM control unit 122 controls the operation of the SRAM 123 based on the distortion quantity of the image data read by and provided from the DMA 121. More specifically, when it is assumed that line memories are arranged in order from top and numbers are added from the topmost line memory, the SRAM control unit 122 controls supply of a clock to the SRAM 123 based on a position of a distortion-maximum line and a position of a distortion-minimum line, thereby reducing the power consumption of the digital photographing device 100. The structure of the SRAM control unit 122 will be later described in more detail.

The SRAM 123 stores image data sequentially from the first line to correct distortion of the image data. The SRAM 123 includes several line memories to store the image data line-by-line. As the number of line memories increases, the quantity of distortion that can be corrected increases and power consumed by operating all the line memories also increases. In the current embodiment, the SRAM control unit 122 controls the operation of the SRAM 123 by controlling supply of the clock to the SRAM 123, thus reducing the power consumption of the digital photographing device 100.

The distortion correction circuit 125 performs distortion correction on the image data by using the image data stored in the SRAM 123. The image data which has been distortion-corrected by the distortion correction circuit 125 is stored in the SDRAM 120 through the DMA 126.

Figure 3:
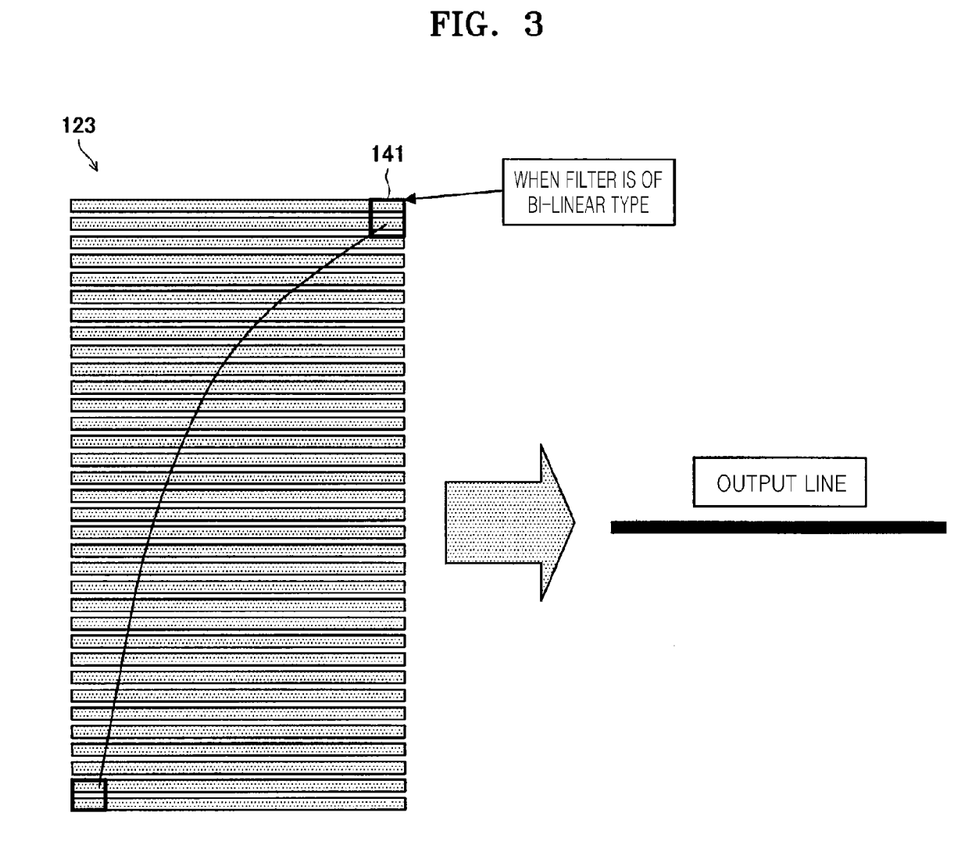
FIG. 3 is a pictorial diagram for describing an example of distorted image data stored in a static random access memory (SRAM) according to an embodiment of the invention.

The distortion correction performed by the distortion correction circuit 125 will be described briefly. FIG. 3 is a diagram for describing an example of distorted image data stored in the SRAM 123 according to an embodiment of the invention. FIG. 3 shows a case where 34 line memories are mounted in the SRAM 123 and a description will be focused on such a case. When a filter used by the distortion correction circuit 125 is a bi-linear filter, the number of horizontal pixels and the number of vertical lines of a ring of the bi-linear filter are 1, respectively, and thus the image data is processed by using a processing window 141 as shown in FIG. 3. Therefore, a maximum number of distortion lines that can be corrected by the 34 line memories are 32 lines.

However, the 32 line memories are not required in every region. For example, if the number of distortion lines obtained by subtracting the number of lines of a ring from a distortion quantity is 24, it is not necessary to use the remaining line memories. According to an embodiment of the invention, in this case, the SRAM control unit 122 performs a control operation in such a way not to supply a clock to line memories of the remaining region determined by subtracting the number of lines of the ring from a quantity of distortion requiring correction, thereby reducing the power consumption of the distortion correction unit 113.

Figure 4:
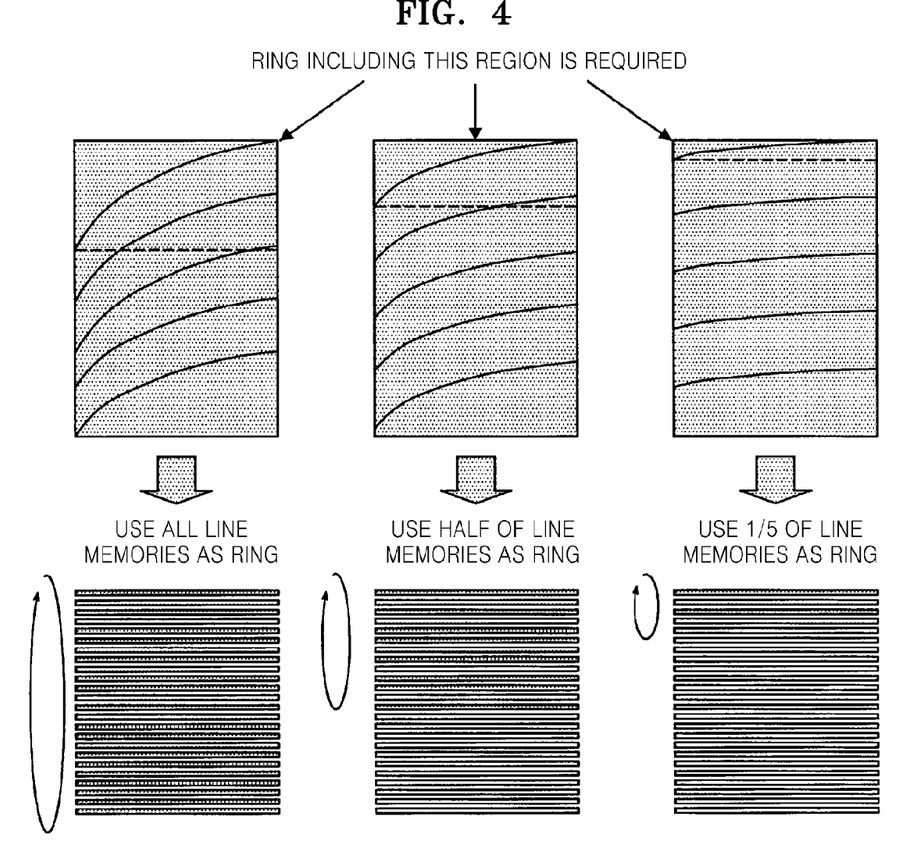
FIG. 4 is a pictorial diagram for describing a structure where the number of necessary line memories varies with a distortion quantity according to an embodiment of the invention.

FIG. 4 is a diagram for describing a structure where the number of necessary line memories varies with a distortion quantity according to an embodiment of the invention. As shown in FIG. 4, the number of line memories necessary for distortion correction varies with a quantity of generated distortion. As the quantity of generated distortion increases, the number of line memories necessary for distortion correction also increases; as the quantity of generated distortion decreases, the number of line memories necessary for distortion correction also decreases. According to an embodiment of the invention, as shown in FIG. 4, it is necessary to use all the line memories for correction of distortion of a maximum quantity, but the number of line memories used decreases as the quantity of distortion decreases. Consequently, by detecting a quantity of distortion in advance and recognizing the number of line memories necessary for correction of the distortion, the SRAM control unit 122 can effectively control the operation of the SRAM 123.

Figure 5:
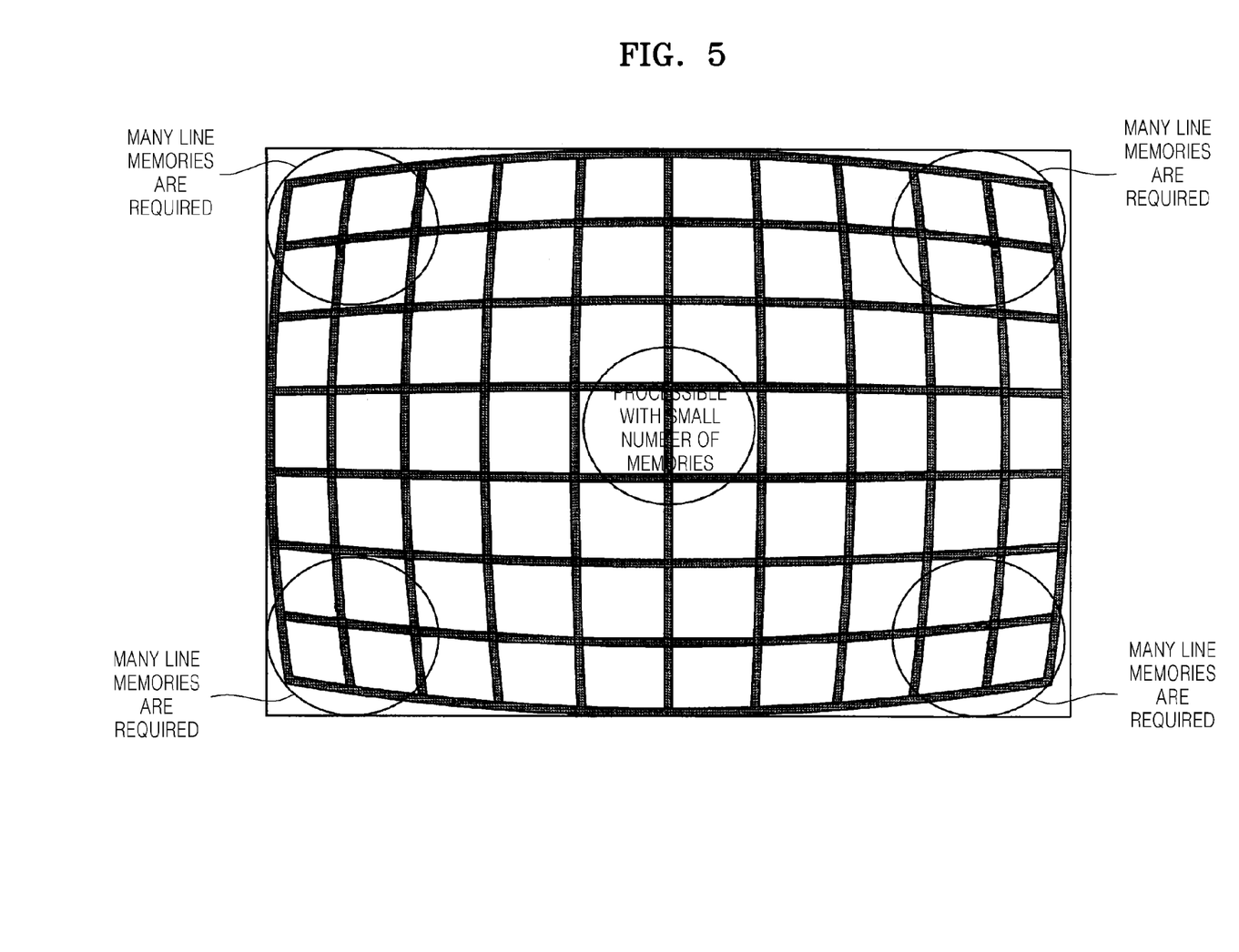
FIG. 5 is a pictorial diagram for describing a phenomenon where a distortion quantity varies with a region of an image according to an embodiment of the invention.

FIG. 5 is a diagram for describing a phenomenon where a distortion quantity varies with a region of an image according to an embodiment of the invention. Much distortion is generated at four corners of an image, but little distortion is generated in a central portion of the image. Thus, many line memories are necessary for distortion correction with respect to the four corners of the image, whereas relatively a few line memories are necessary for distortion correction with respect to the central portion of the image. Subsequently, the image is divided into several regions, for example, in a vertical direction, the regions are classified into much-distortion regions and little-distortion regions, and distortion correction is performed on the image based on the classified regions, whereby the SRAM control unit 122 can effectively control the operation of the SRAM 123 suitably for the regions.

For the effective control of the operation of the SRAM 123 by the SRAM control unit 122, it is necessary to provide information about a distortion-maximum line and a distortion-minimum line to the SRAM control unit 122. As a method of providing information about a distortion-maximum line and a distortion-minimum line to the SRAM control unit 122, a first method of setting the information about the distortion-maximum line and the distortion-minimum line for each target block as register setting by the CPU 104; a second method of writing the information about the distortion-maximum line and the distortion-minimum line, together with image data, in the SDRAM 120 and reading the same from the SDRAM 120 during distortion correction; or a third method of separately installing a way of calculating the information about the distortion-maximum line and the distortion-minimum line based on a set distortion quantity may be considered. In the current embodiment, the second method will be described as the most efficient method.

By writing the information about the distortion-maximum line and the distortion-minimum line, together with the image data, in the SDRAM 120, the information about the distortion-maximum line and the distortion-minimum line is stored and then read out for each distortion-correction target line that is subject to distortion correction, thus changing a ring in distortion correction line-by-line.

Figure 6:
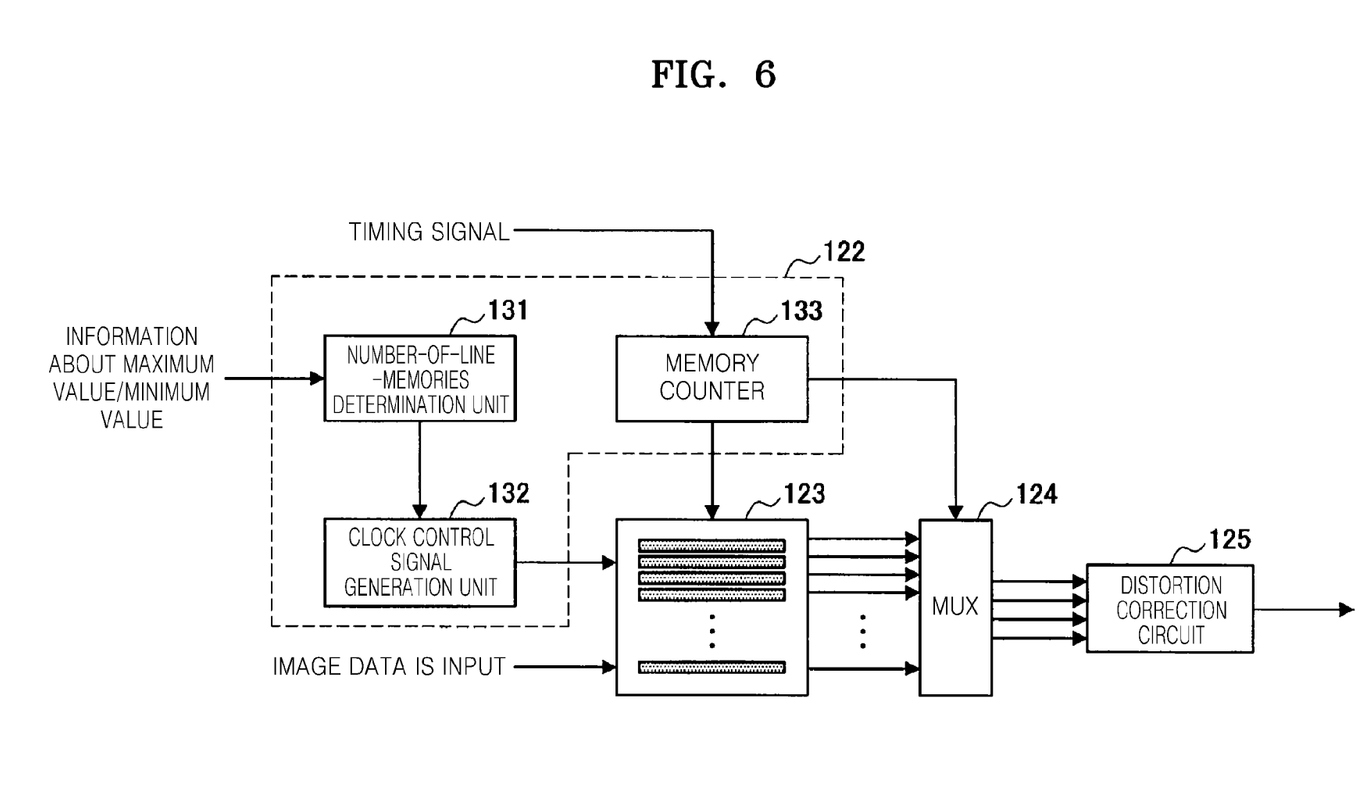
FIG. 6 is a block diagram of an SRAM control unit according to an embodiment of the invention.

FIG. 6 is a block diagram of the SRAM control unit 122 according to an embodiment of the invention. As shown in FIG. 6, the SRAM control unit 122 may include a number-of-line-memories determination unit 131, a clock control generation unit 132, and a memory counter 133.

The number-of-line-memories determination unit 131 determines the number of line memories to be used based on the information about the distortion-maximum line and the distortion-minimum line of a distortion-correction target. For example, if the number of vertical lines of a ring of a bi-linear filter is 1 and a value obtained by subtracting the distortion-minimum line from the distortion-maximum line and then adding the number of vertical lines to the subtraction result is 24, 24 line memories are required to correct the distortion of a corresponding line. In other words, line memories other than necessary line memories may be disabled without causing any problem, and power consumption can be reduced by disabling the unnecessary line memories. Information about the number of line memories necessary for distortion correction, determined by the number-of-line-memories determination unit 131, is output to the clock control signal generation unit 132.

The clock control signal generation unit 132 generates a clock control signal for controlling a clock supplied to line memories mounted in the SRAM 123 based on the information about the number of line memories necessary for distortion correction, determined by the number-of-line-memories determination unit 131. For example, if the number-of-line-memories determination unit 131 determines that 24 line memories are necessary for distortion correction, the clock control signal generation unit 132 generates a clock control signal for supplying a clock only to the 24 line memories.

The memory counter 133 changes its counter value based on a timing signal output from the CPU 104.

By constructing the SRAM control unit 122 as described above, the SRAM control unit 122 can maintain a maximum value and a minimum value of lines used for distortion correction by 1 line respectively. By comparing a maximum distortion quantity and a minimum distortion quantity of a line immediately prior to a currently processed line with those of the currently processed line, the SRAM control unit 122 may determine the number of discard line memories in the SRAM 123 and the number of additional read line memories in the SRAM 123.

The data read from the SRAM 123 whose read line memories are controlled by the clock control signal generation unit 132 is multiplexed by the MUX 124 and then output to the distortion correction circuit 125 to be used for distortion correction of the distortion correction circuit 125.

The structure of the SRAM control unit 122 has been described above with reference to FIG. 6. By constructing the SRAM control unit 122 as described above, only line memories of a number determined based on a distortion quantity can be enabled, thereby reducing the power consumption of the digital photographing device 100 during distortion correction. Next, operations of the distortion correction unit 113 according to an embodiment of the invention will be described.

Figure 7:
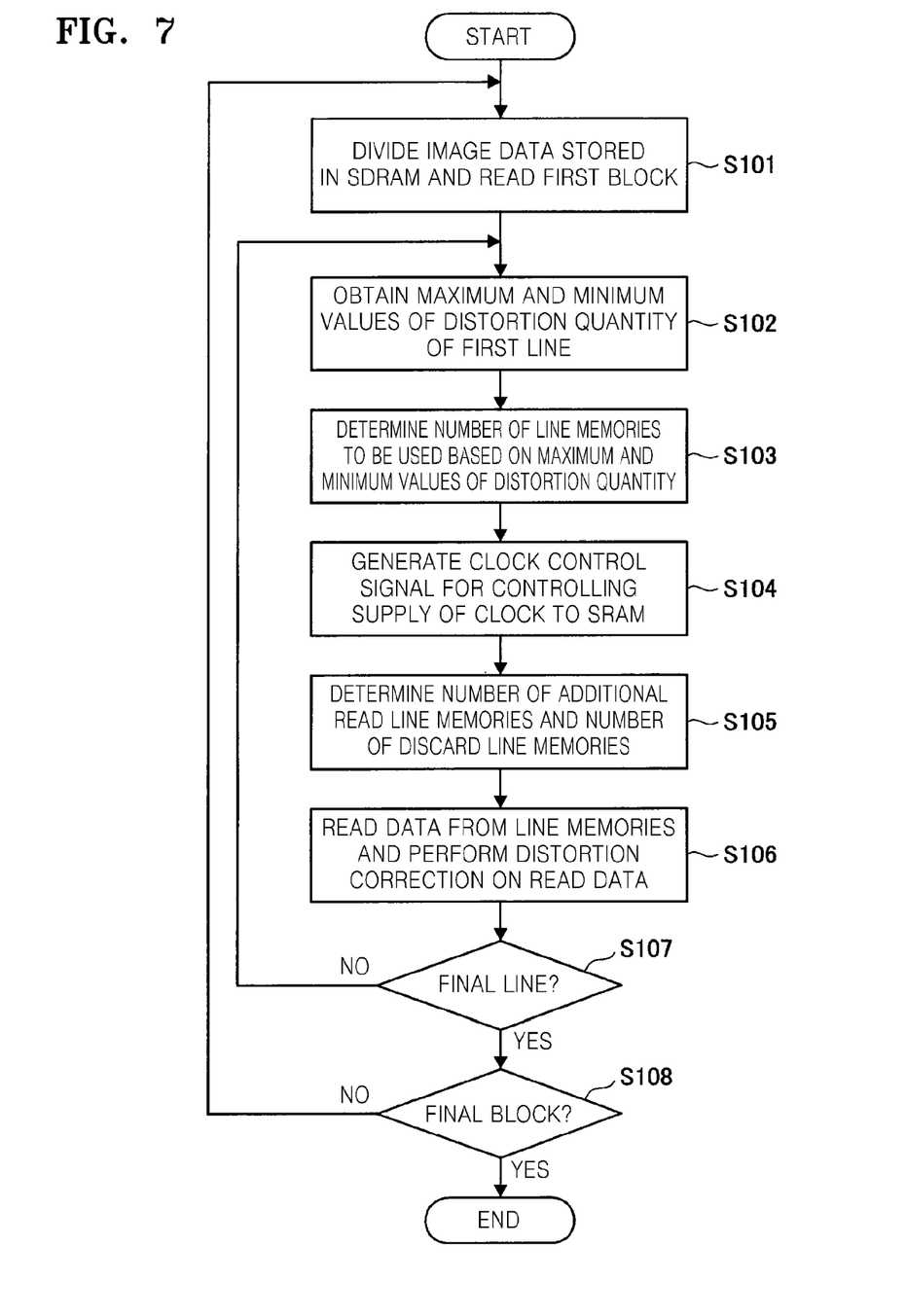
FIG. 7 is a flowchart illustrating operations of the distortion correction unit according to an embodiment of the invention.

FIG. 7 is a flowchart illustrating the operations of the distortion correction unit 113 according to an embodiment of the invention. Hereinafter, the operations of the distortion correction unit 113 according to an embodiment of the invention will be described with reference to FIG. 7.

The distortion correction unit 113 divides image data stored in the SDRAM 120 into several rectangular blocks in a horizontal direction and reads the first block from the SDRAM 120 in operation S101. Distortion correction of the image data by the distortion correction unit 113 may begin with any block, but in the current embodiment, the distortion correction unit 113 performs the distortion correction in a direction from the leftmost block to the rightmost block.

When the distortion correction unit 113 performs distortion correction on the first block, the distortion correction unit 113 obtains a maximum value and a minimum value of a distortion quantity of the first line in operation S102. The maximum value and the minimum value of the distortion quantity of the first line are obtained by the DMA 121.

Once the DMA 121 obtains the maximum value and the minimum value of the distortion quantity of the first line in operation S102, the number-of-line-memories determination unit 131 determines the number of line memories to be used based on the obtained maximum and minimum values of the distortion quantity of the first line in operation S103.

Once the number-of-line-memories determination unit 131 determines the number of line memories to be used in operation S103, the clock control signal generation unit 132 generates a clock control signal for controlling supply of a clock to the SRAM 123 based on information about the number of line memories in operation S104.

After the clock control signal generation unit 132 generates the clock control signal for controlling supply of the clock to the SRAM 123 in operation S104, the line counter 133 determines the number of additional read line memories and the number of discard line memories in operation S105.

Figure 8:
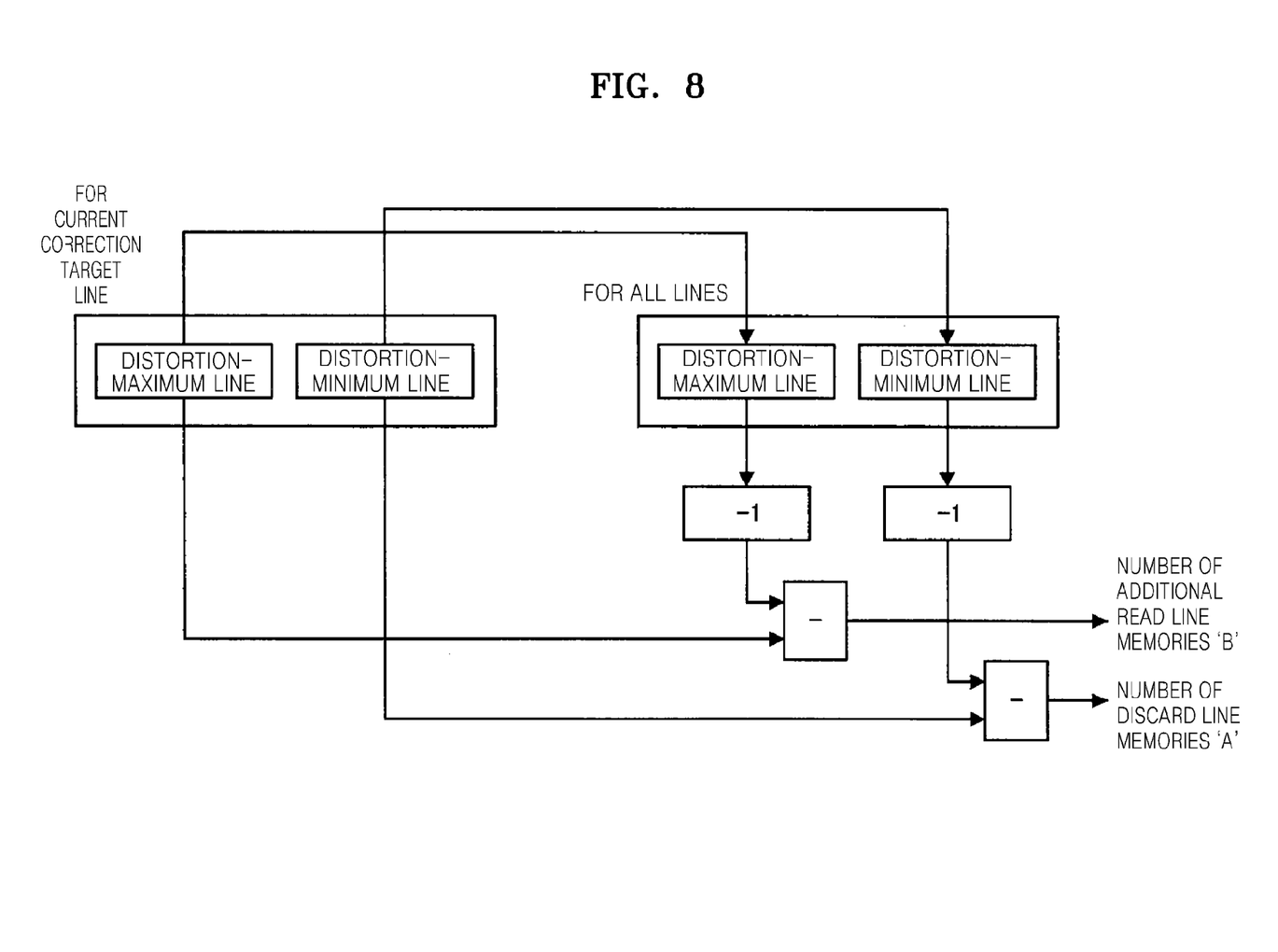
FIGS. 8 and 9 are pictorial diagrams for describing a method of determining the number of additional read line memories and the number of discard line memories according to an embodiment of the invention.
Figure 9:
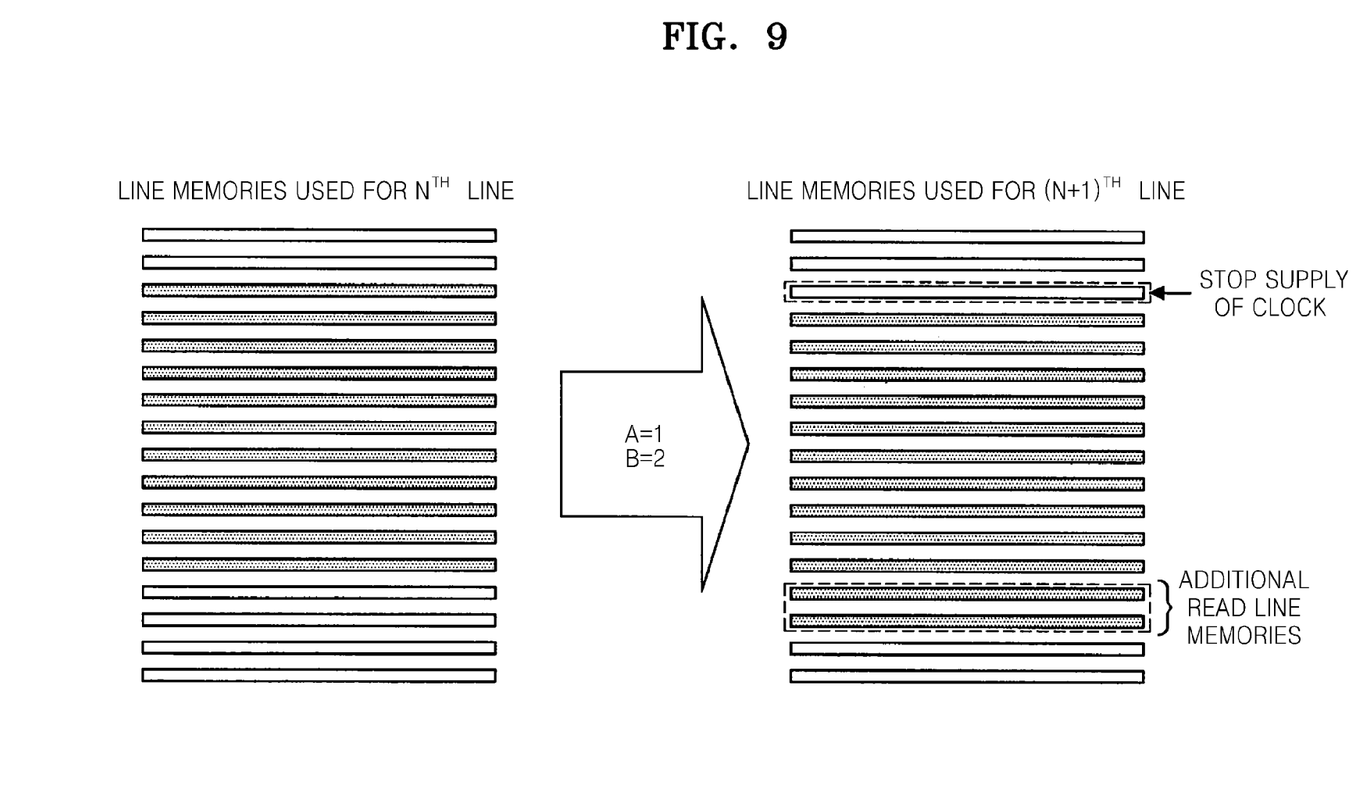

FIGS. 8 and 9 are diagrams for describing a method of determining the number of additional read line memories and the number of discard line memories according to an embodiment of the invention. FIG. 8 shows a state where the number of additional read line memories and the number of discard line memories are determined from a maximum value and a minimum value of a distortion quantity of a current line subject to distortion correction and a maximum value and a minimum value of a distortion quantity of a previous line immediately before the current line. That is, 1 is subtracted from each of the maximum and minimum values of the distortion quantity of the previous line, and the subtraction results are subtracted from the maximum and minimum values of the distortion quantity of the current line, whereby the final results are determined as the number of additional read line memories and the number of discard line memories, respectively.

FIG. 9 shows a state of line memories used for distortion correction of an $N^{th}$ line and a state of line memories used for distortion correction of an $(N+1)^{th}$ line. For example, if the number of additional read line memories 'B' is determined to be 2 and the number of discard line memories 'A' is determined to be 1, supply of a clock to the top line memory among line memories used for distortion correction of the $N^{th}$ line as shown in FIG. 9 is stopped and a clock is supplied to two line memories under the bottom line memory among the used line memories.

In this way, the SRAM control unit 122 controls supply of a clock to a line memory such that the clock is supplied only to line memories necessary for distortion correction, thereby reducing power consumption when compared to a case where a clock is supplied to all the line memories and distortion correction is performed by operating all the line memories. By determining additional read line memories and discard line memories for every distortion-correction target line, control of supply of a clock to line memories in distortion correction can be simplified.

Once the line counter 133 determines the number of additional read line memories and the number of discard line memories in operation S105, a clock is supplied to the SRAM 123 to operate only necessary line memories and then the distortion correction circuit 125 performs distortion correction on a distortion-correction target line by using data read from the line memories in operation S106. The distortion correction circuit 125 uses a bi-linear filter for the distortion correction as already mentioned. A detailed description of the distortion correction performed by the distortion correction unit 125 will not be provided.

Once the distortion correction circuit 125 performs distortion correction on the distortion-correction target line in operation S106, the distortion correction circuit 125 determines whether this distortion correction is for the final line in operation S107. If not, the process goes back to operation S102 to obtain maximum and minimum values of a distortion quantity of a next line. Otherwise, if the current distortion correction is for the final line, the distortion correction circuit 125 determines whether the current distortion correction is for the final block in operation S108. If not, the process goes back to operation S101 to initiate distortion correction for a next block. Otherwise, if the current distortion correction is for the final block, the distortion correction process for image data is terminated.

The operations of the distortion correction unit 113 according to an embodiment of the invention have been described above.

As described above, the digital photographing device 100 according to an embodiment of the invention obtains maximum and minimum values of a distortion quantity when correcting distortion of image data and controls supply of a clock to the SRAM 123 based on the obtained maximum and minimum values, thereby operating only line memories necessary for the distortion correction. Hence, power consumption can be reduced by controlling operations of the SRAM 123 necessary for distortion correction. In particular, even when the configuration of the SRAM 123 cannot be changed in an image processing circuit having a distortion correction function, embedded in the digital photographing device 100, the power consumption of the digital photographing device 100 can be effectively reduced.

As is apparent from the foregoing description, the embodiment of the invention can provide an image processing apparatus and method capable of reducing power consumption by controlling supply of a clock to a memory when distortion correction is performed on image data.

While the invention has been particularly shown and described with reference to an exemplary embodiment thereof, it will be understood by those of ordinary skill in the art that various changes in form and details may be made therein without departing from the spirit and scope of the invention as defined by the following claims and such changes are also included in the technical scope of the invention.

For example, the digital photographing device 100 has been described as an example of an image processing apparatus in the foregoing embodiment, but the invention is not limited to the example. The invention can also be applied to other devices than a digital photographing device, such as a digital video camera, a film camera, other photographing devices, or an information processing device for correcting distortion of captured image data.

Although a description has been made of an example where the power consumption of an SRAM is reduced in distortion correction in the foregoing embodiment, the invention is not limited to this example. For example, when chromatic aberration correction is performed using an SRAM including several line memories, many SRAMs are necessary for chromatic aberration correction with respect to a portion where the aberration of red or blue is large relative to green; the number of SRAMs may be small with respect to a portion where the aberration of red or blue is not large. Therefore, for a case where the aberration is not large and a small number of SRAMs may be used, an aberration is detected to detect the number of line memories necessary for correction of the aberration, and a clock supplied to an SRAM is controlled to operate only necessary line memories, thereby reducing the power consumption of the image processing apparatus.

The invention can be embodied as a non-transitory computer-readable code on a computer-readable medium. The computer-readable medium is any data storage device that can store data which can be thereafter read by a computer system.

The computer-readable code is configured to perform operations implementing the image processing method according to the invention when the computer-readable code is read from the computer-readable medium and then executed by the CPU 104. The computer-readable code may be implemented with various programming languages. Also, functional programs, code, and code segments for implementing the invention can be easily programmed by those of ordinary skill in the art.

Examples of the computer-readable recording medium include read-only memory (ROM), random-access memory (RAM), CD-ROMs, magnetic tapes, floppy disks, and optical data storage devices. The computer-readable recording medium can also be distributed over network of coupled computer systems so that the computer-readable code is stored and executed in a decentralized fashion.

While the invention has been particularly shown and described with reference to an exemplary embodiment thereof, it will be understood by those of ordinary skill in the art that the invention may be implemented in modified forms without departing from the true features of the invention as defined by the following claims. Accordingly, the disclosed embodiment should be considered in an illustrative sense not in a limiting sense. The scope of the invention is defined not by the detailed description of the invention but by the appended claims, and the invention claimed in the appended claims and inventions equivalent to the claimed invention will be construed as being included in the invention.

All references, including publications, patent applications, and patents, cited herein are hereby incorporated by reference to the same extent as if each reference were individually and specifically indicated as incorporated by reference and were set forth in its entirety herein.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. An image processing apparatus comprising:
    an image correction unit comprising a plurality of line memories, the image correction unit for maintaining image data line-by-line and performing correction on the image data;
    a number-of-line-memories determination unit for determining the number of line memories necessary for the correction performed by the image correction unit line-by-line; and
    a line memory control unit for controlling supply of a clock to the plurality of line memories based on the number of line memories determined by the number-of-line-memories determination unit to supply a clock to the line memories used for the correction performed by the image correction unit line-by-line and stop supply of the clock to line memories not used for the correction.

2. The image processing apparatus of claim 1, wherein the line memory control unit controls the supply of the clock to the plurality of line memories each time the correction of a correction target line of the image data is completed.

3. The image processing apparatus of claim 1, wherein the image correction unit performs distortion correction to correct distortion of the image data.

4. The image processing apparatus of claim 3, wherein the number-of-line-memories determination unit determines the number of line memories line-by-line by using information about a distortion quantity of the image data.

5. The image processing apparatus of claim 1, wherein the image correction unit performs chromatic aberration correction to correct chromatic aberration of the image data.

6. The image processing apparatus of claim 1, further comprising an image data storing unit for storing the image data to be corrected by the image correction unit and a maximum value and a minimum value of a distortion quantity of each correction target line of the image data, wherein the number-of-line-memories determination unit determines the number of line memories necessary for the correction performed by the image correction unit line-by-line based on the maximum value and the minimum value stored in the image data storing unit.

7. An image processing method comprising:
    maintaining, in an image correction operation, image data line-by-line in a plurality of line memories and performing correction on the image data;
    determining, with a number-of-line-memories determination operation, the number of line memories necessary for the correction performed by the image correction unit line-by-line; and
    controlling, with a line memory controlling operation, a supply of a clock to the plurality of line memories based on the number of line memories determined by the number-of-line-memories determination unit to supply a clock to the line memories used for the correction performed by the image correction unit line-by-line and stop supply of the clock to line memories not used for the correction.

8. The image processing method of claim 7, wherein the image correction operation comprises performing distortion correction to correct distortion of the image data.

9. The image processing method of claim 8, further comprising an image dividing operation of dividing the image data that is subject to the correction of the image correction operation, wherein the image dividing operation comprises performing the correction on the divided image data.

10. The image processing method of claim 7, wherein the image correction operation comprises performing chromatic aberration correction to correct chromatic aberration of the image data.

* * * * *